US005459833A

United States Patent [19]

Nishizawa

[11] Patent Number: 5,459,833

[45] Date of Patent: Oct. 17, 1995

[54] DISPLAY CONTROL SYSTEM

[75] Inventor: Yoshiyuki Nishizawa, Hadano, Japan

[73] Assignee: Ricoh Company, Ltd., Tokyo, Japan

[21] Appl. No.: 166,887

[22] Filed: Dec. 15, 1993

[30] Foreign Application Priority Data

Dec. 15, 1992 [JP] Japan .................................... 4-354097

[51] Int. Cl.[6] ........................................ G06F 15/00

[52] U.S. Cl. ........................................ 395/162; 394/164

[58] Field of Search .................................... 395/162, 164, 395/166, 700, 750; 345/185–187, 189, 901; 364/231, 231.1, 231.2, 231.3, 231.31

[56] References Cited

U.S. PATENT DOCUMENTS 4,881,205 11/1989 Aihara .................................... 365/222
5,241,680 8/1993 Cole ........................................ 395/750
5,252,959 10/1993 Kono ....................................... 345/147

*Primary Examiner*—Mark R. Powell
*Assistant Examiner*—U. Chauhan
*Attorney, Agent, or Firm*—Oblon, Spivak, McClelland, Maier & Neustadt

[57] ABSTRACT

A display control system for a notebook type personal computer, word processor or similar electronic apparatus requiring a power saving implementation. The system has a first memory for storing graphic data, and a control section for reading the graphic data out of the first memory repetitively. The control section has a circuit for determining whether or not the graphic data each being stored in a respective address of the first memory to be displayed side by side in a picture of the display are identical with each other, and a second memory for memorizing whether or not the data are identical with each other. When the content of the second memory is representative of identity of graphic data, the control section causes the graphic data to be displayed without reading the first memory, thereby reducing the power consumption of the system.

7 Claims, 6 Drawing Sheets

S : START ADDRESS OF VRAM
K : NUMBER OF WORDS OF VRAM

DISPLAY CONTROL SYSTEM

BACKGROUND OF THE INVENTION

1. Field of the Invention

The present invention relates to a display control system advantageously applicable to a notebook type personal computer, word processor or similar small size electronic apparatus requiring a power saving implementation. More particularly, the present invention is concerned with a display control system operable with a minimum of power to extend the continuous operation time of the apparatus.

2. Description of the Background

A personal computer or a word processor, for example, can be powered by a battery and should preferably be operable continuously over a long period of time, particularly, a notebook type personal computer is equivalent in performance and function to a desk-top type personal computer and can be powered by a battery. However, the problem is that the continuous operation time of the personal computer is limited by the capacity of the battery and, therefore, cannot operate continuously over a sufficiently long period of time. Further, there is an increasing demand for electronic apparatuses, whether they be powered by a battery or not, having a power saving configuration. Regarding a display, various power saving implementations have also been proposed in the past. For example, Japanese Patent Laid-Open Publication (Kokai) No. 59-2081 teaches a drive circuit applicable to a plasma display panel which is capable of displaying data in a plurality of modes, e.g., a segment display mode and a dot matrix display mode and effects each of such modes with a particular drive circuit. The drive circuit disclosed in this Laid-Open Publication interrupts power supply to, among the drive circuits, one assigned to the display mode not used and one assigned the display mode held in a blanking state. Japanese Patent Laid-Open Publication No. 3-105561 discloses a word processor which senses data appearing in a picture and implements both the anti-deterioration of the display and the power saving effect by combining the fall of brightness and the shut-off of power supply.

However, the prior art implementations are not fully satisfactory in respect of power saving.

SUMMARY OF THE INVENTION

It is, therefore, an object of the present invention to reduce the power consumption of a display control system included in a battery powered electronic apparatus, thereby extending the continuous operation time of the apparatus.

A display control system for reducing the power consumption of a display of the present invention comprises a first memory for storing graphic data, and a control section for reading the graphic data out of the first memory repetitively. The control section has a determining circuit for determining whether or not the graphic data each being stored in a respective address of the first memory to be displayed side by side in a picture of the display are identical with each other, and a second memory for memorizing whether or not the data are identical with each other. When the content of the second memory is representative of identity of graphic data, the control section causes the graphic data to be displayed without reading the first memory to thereby reduce power consumption of the display control system.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1A:
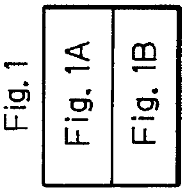
FIG. 1 is a block diagram schematically showing a conventional notebook type personal computer.
Figure 1A:
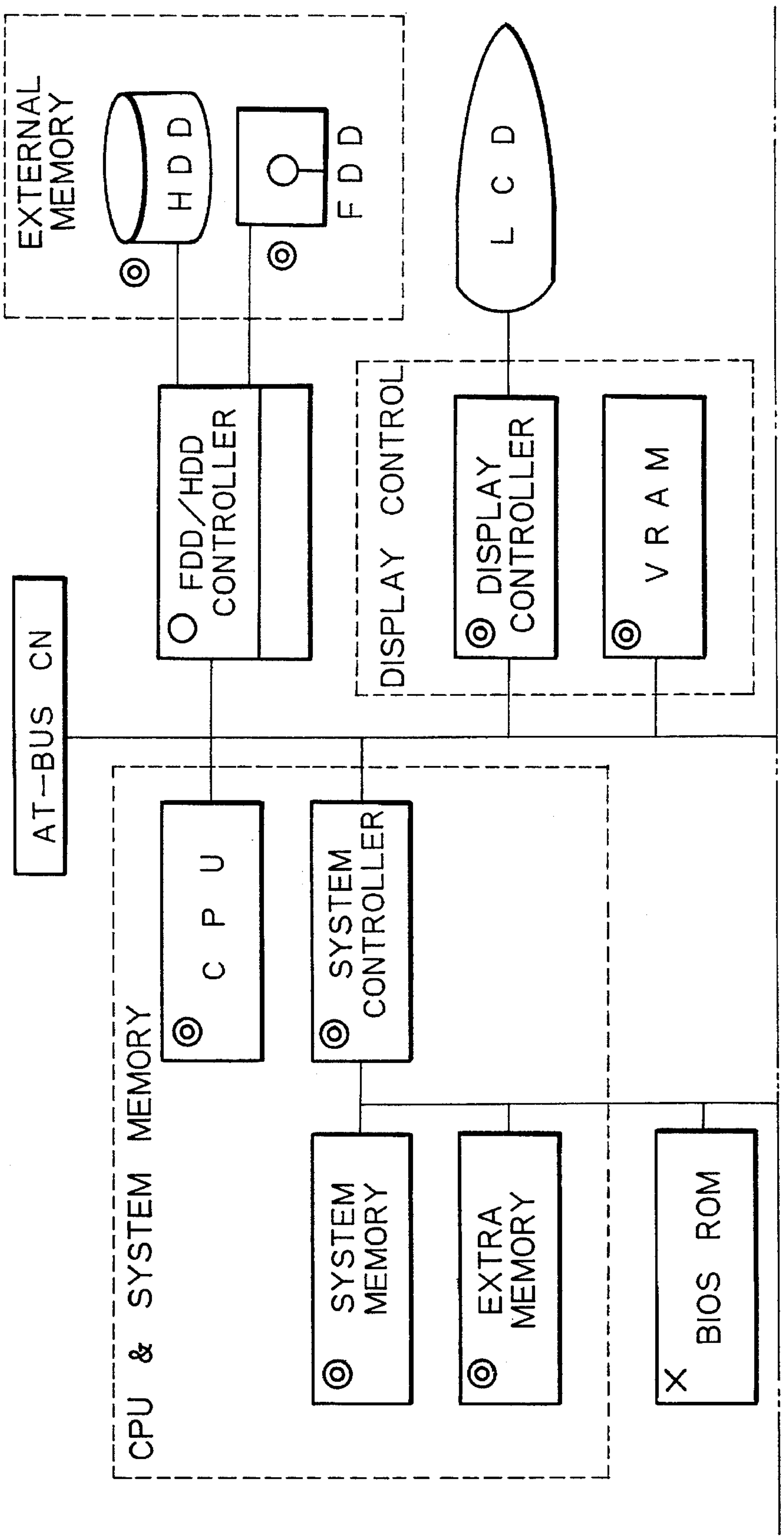
Figure 1B:
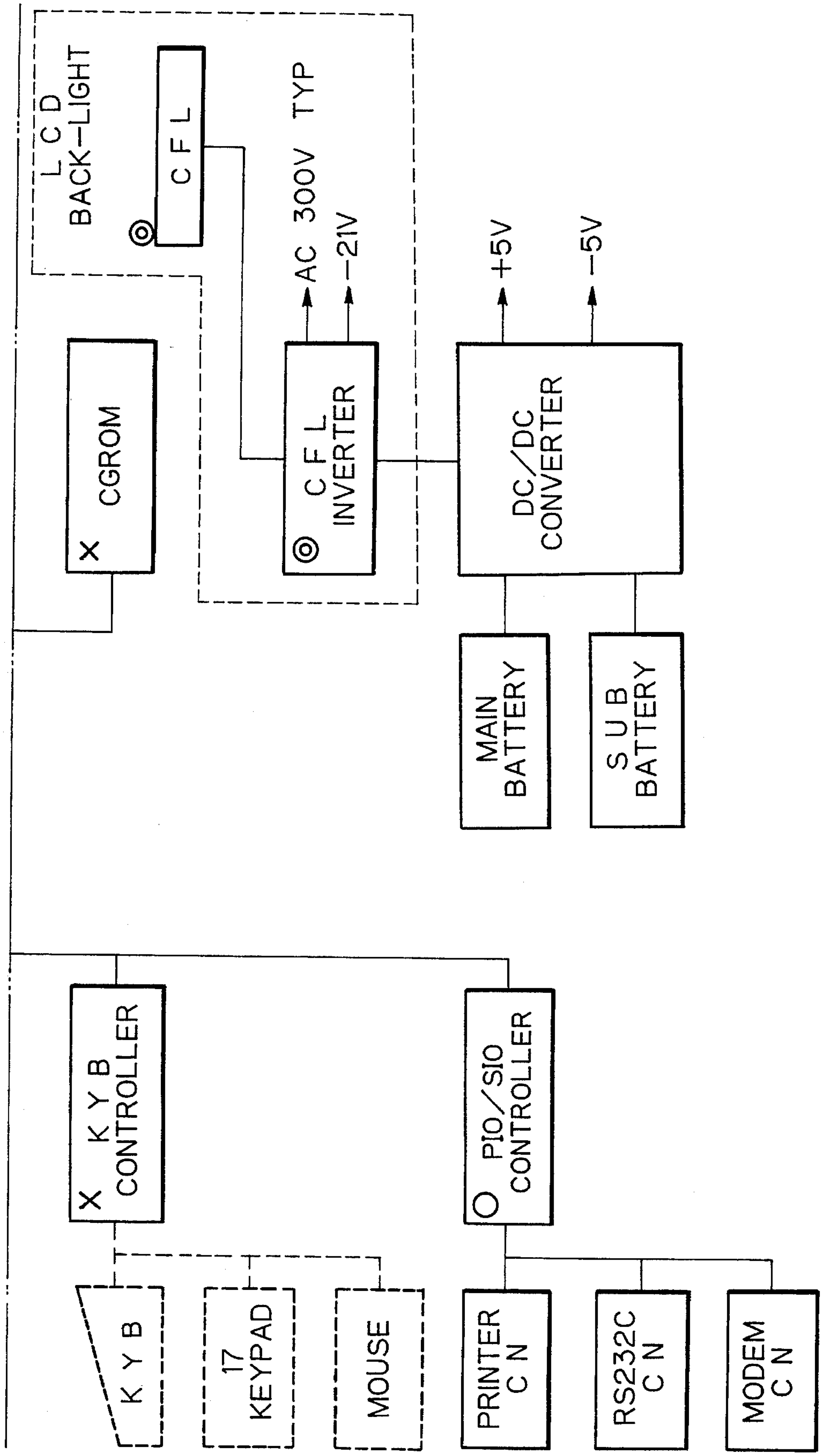

To better understand the present invention, a brief reference will be made to a conventional notebook type personal computer, shown in FIG. 1. The construction and operation of this type of personal computer are well known in the art and will not be described herein specifically. Let the following description concentrate on power consumption relating to the operation time of the personal computer. In FIG. 1, blocks which consume great power, blocks which consume medium power, and blocks which consume small power are marked with a double circle, a circle, and a cross, respectively. The blocks consuming great power may generally be classified into the following four sections:

1. CPU (Central Processing Unit) and system memory section
2. External memory section
3. LCD (Liquid Crystal Display) back-light section
4. Display control section A particular power saving scheme is available with each of the above-mentioned four sections 1–4. Among the sections 1–4, the display control section has to transfer display data from a VRAM to an LCD at all times at a frequency which the LCD requires. Specifically, the display control section reads data out of the VRAM repetitively, transforms the data to a format matching the LCD, and then sends the data to the LCD.

Figure 2:
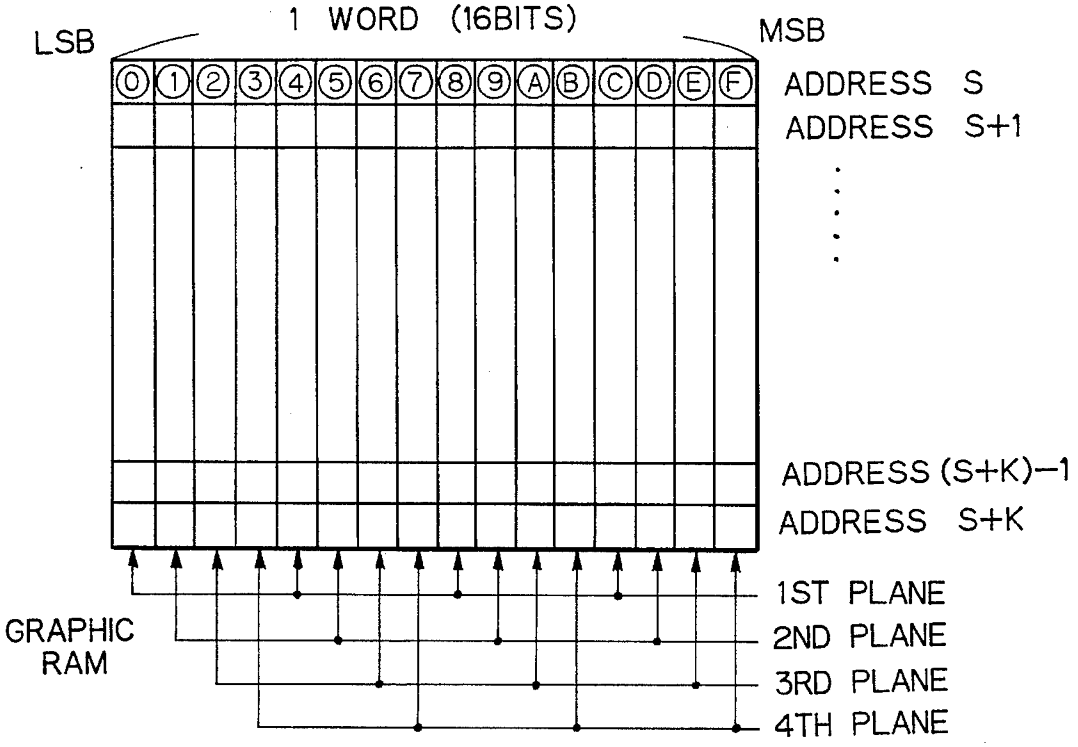
FIG. 2 shows a relation between a graphic RAM (Random Access Memory) and a picture.
Figure 2:
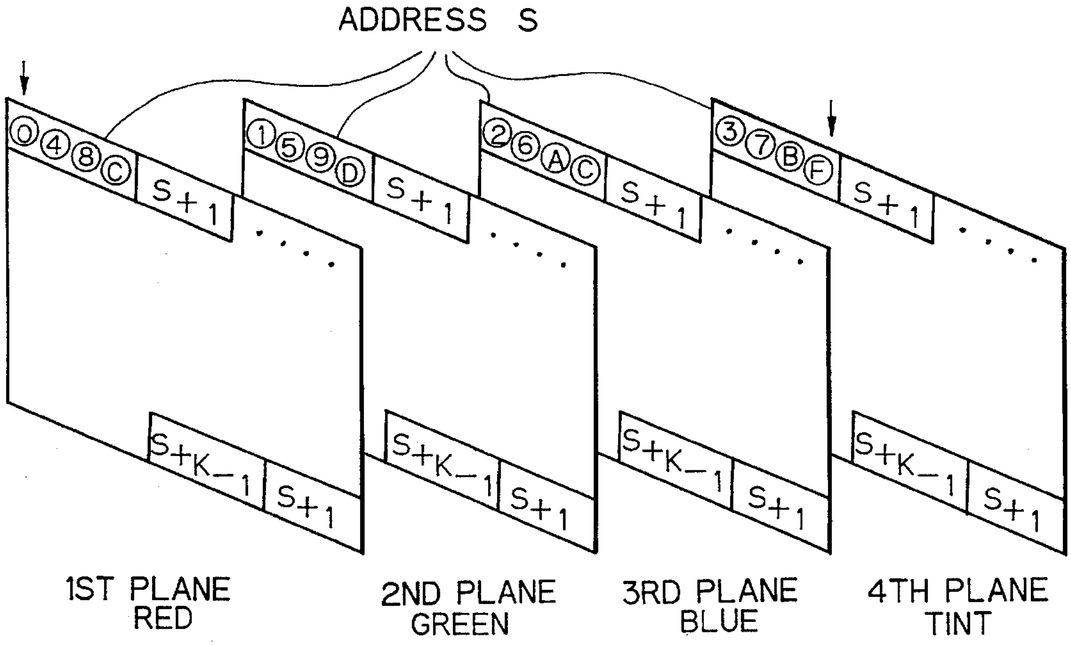

FIG. 2 illustrates a specific relation between the contents of a graphic RAM and a picture appearing on a display. The display sequentially displays data from the top left to the bottom right. Hence, the display control section sequentially reads data out of the graphic RAM, i.e., VRAM from the top left to the bottom right while sending the data to the display. Specifically, in FIG. 2, the display control section reads data out of the VRAM in the order of addresses S, S+1, S+2, . . . , S+K and then returns to the address S again. The VRAM stores the contents of each picture dot by dot. To define colors, the picture of the display consists of a plurality of planes, e.g., four planes as shown in FIG. 2. Assuming that each address of the VRAM has sixteen bits, as illustrated, it can store four dots included in the four planes. Therefore, the first dot located at the top left defines a particular color by combining data stored in the bits 0, 1, 2 and 3 of the address S. In this case, since the number of bits is four, there can be defined $2^4=16$ different colors in total. If desired, the number of planes may be increased to, for example, eight to render $2^8$=256 colors or to sixteen to implement $2^{16}$=65536 colors.

A great current is necessary for data to be read out of the VRAM. In practice, however, it is not necessary for a notebook type personal computer to change the color dot by dot except when a desired pattern should be displayed in a character portion or the background. For example, when a word processor is used to prepare a document, it often occurs that some lines are left blank or that the lines where characters are present have their right portions left blank. Also, when computation software available with the personal computer is used, characters are sparsely distributed over the picture. Further, in such cases, it is not desirable to display a fine pattern in the background. For these reasons, consecutive dots in the picture are usually representative of the same data. In accordance with the present invention, when consecutive dots are representative of the same color, display data to be fed to the display can be generated without reading the VRAM, as will be described specifically later. This is successful in reducing power consumption.

Figure 3:
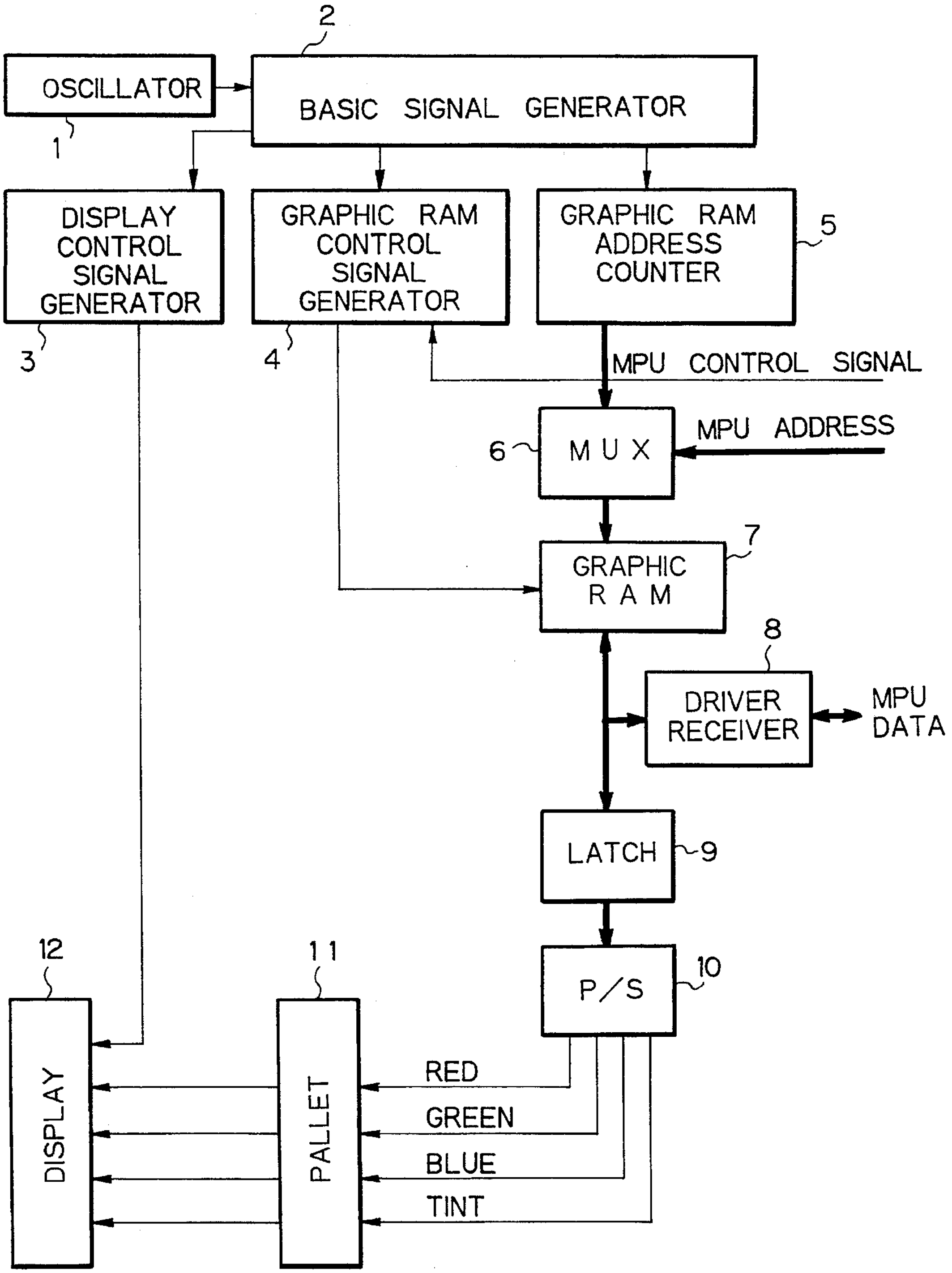
FIG. 3 is a block diagram schematically showing a conventional display control system.

FIG. 3 shows a conventional display control system specifically. As shown, the display control system has an oscillator 1, a basic signal generator 2, a display control signal generator 3, a graphic RAM control signal generator 4, a graphic RAM address counter 5, a multiplexer (MUX) 6, a graphic RAM 7, a driver receiver 8, a latch 9, a parallel-to-serial converter (P/S) 10, and a pallet 11. Also shown in the FIG. 3 is a display 12. Generally, the display control section is so constructed as to transfer a control signal and display data to the display 12 at a predetermined period matching the display 12. Hence, the oscillator 1 and basic signal generator 2 generate a basic clock signal. In response to the clock signal, the display control signal generator 3 produces a control signal for controlling the display 12. Also, in response to the clock signal, the graphic RAM control signal generator 4 produces a control signal meant for the graphic RAM 7 in order to sequentially send display data. Further, the address counter 5 generates the consecutive addresses of the graphic RAM 7 on the basis of the clock signal.

The addresses generated by the address counter 5 are used to read data out of the graphic RAM 7. On the other hand, the addresses for writing data in the graphic RAM 7 are fed from an MPU (MicroProcesor Unit). The addresses from the address counter 5 and MPU are applied to the multiplexer 6. The multiplexer 6 selects one of the two different kinds of addresses matching the operation and feeds it to the graphic RAM 7. Data to write are also fed from the MPU to the display control system. To prevent the display data read out of the graphic RAM 7 and the write data fed from the MPU from conflicting each other, the data bus from the MPU is connected to the data bus of the graphic RAM 7 via the driver receiver 8.

To display data, the addresses generated by the address counter are sequentially applied to the graphic RAM 7 via the multiplexer 6. In response, data are sequentially output from the graphic RAM 7 and latched by the latch 9. The data latched by the latch 9 are divided plane by plane and then transformed to serial data by the parallel-to-serial converter The pallet 11 receives the serial data, selects colors, and 10. The pallet 11 receives the serial data, selects colors, and then sends the resulting data to the display 12.

Figure 4:
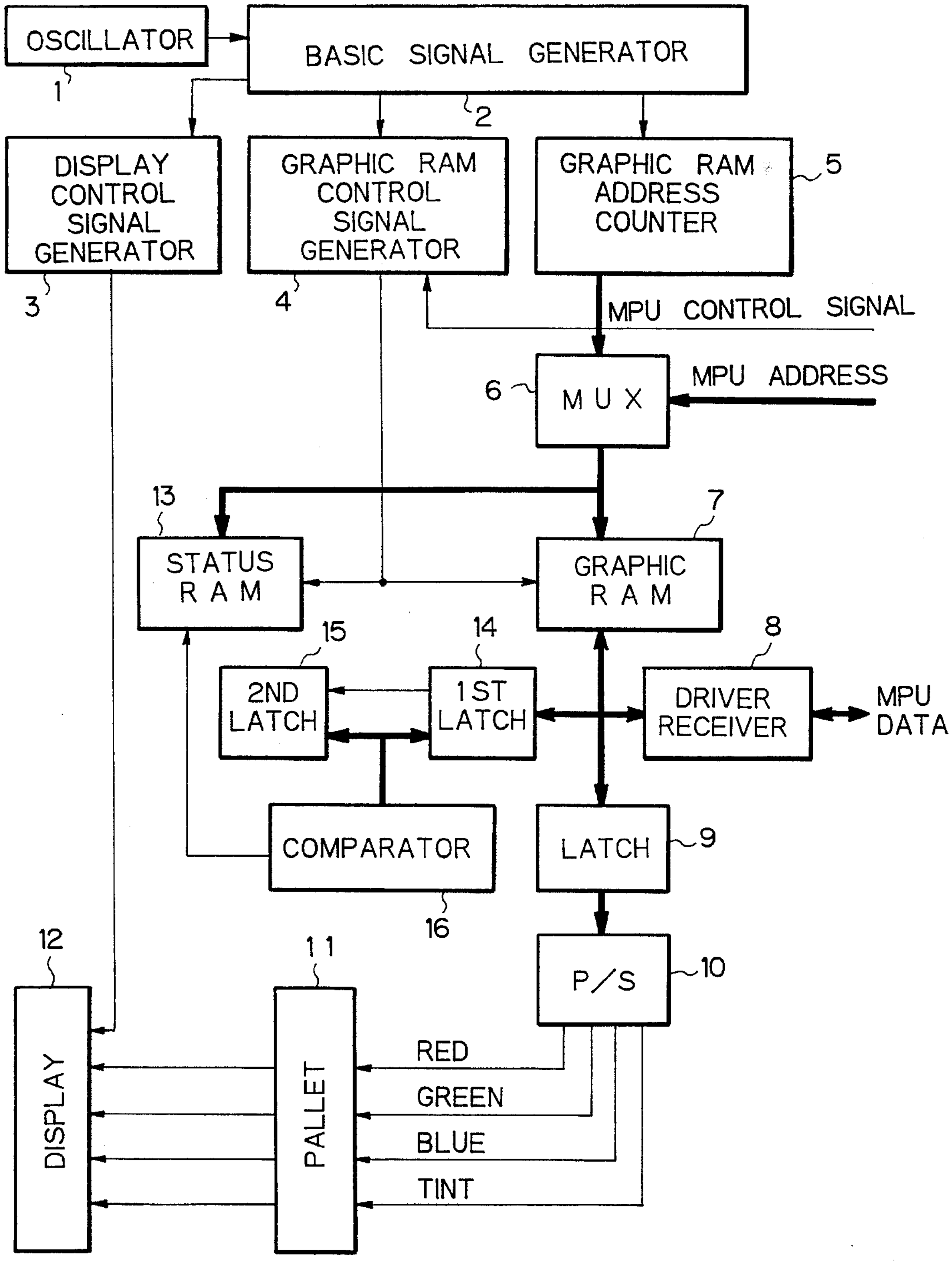
FIG. 4 is a schematic block diagram showing a display control system embodying the present invention.

Referring to FIG. 4, a display control system embodying present invention is shown. In FIG. 4, the same or similiar constituents as or to the constituents of FIG. 3 are designated by the same reference numerals, and a detailed description thereof will not be made in order to avoid redundancy. As shown, the embodiment has a status RAM 13, a first latch 14, a second latch 15, and a comparator 16 in addition to the blocks shown in FIG. 3. The status RAM 13 memorizes the statuses of the graphic RAM 7.

Statuses are written to the status RAM 13, as follows. In the event of display, the addresses of the graphic RAM address counter 5 are sequentially fed to the graphic RAM 7. As a result, data stored in the corresponding addresses of the graphic RAM 7 are sequentially processed as stated earlier and transferred to the display 12. At the same time, the content of a given address of the graphic RAM 7 is fed to and latched in the first latch 14. Subsequently, the graphic RAM address counter 5 is incremented by 1 (one), and the content of the next address of the graphic RAM 7 is transferred to the display 12 and the first latch 14. At this instant, the data stored in the first latch 14 is transferred to and latched in the second latch 15. The comparator 16 compares the contents of the two latches 14 and 15 to see if they are identical or not. If the contents of the latches 14 and 15 are identical, a (logical) ONE is written to the address of the status RAM 13 designated by the graphic RAM address counter 5; if otherwise, a (logical) ZERO is written to the same address of the status RAM 13. In this manner, ONEs and ZEROs are written to the status RAM 13 while all the addresses of the graphic RAM 7 are read out once.

When the status RAM 13 is set as described above, data should only be read out of the addresses of the graphic RAM 7 corresponding to the ZEROs written in the status RAM 13. In practice, however, the MPU sometimes rewrites the content of the graphic RAM 7 simultaneously with a display operation or, in a more strict sense, between individual address display. Then, the content of the status RAM 13 does not represent the content of the graphic RAM 7 faithfully and, therefore, has to be updated.

Figure 5:
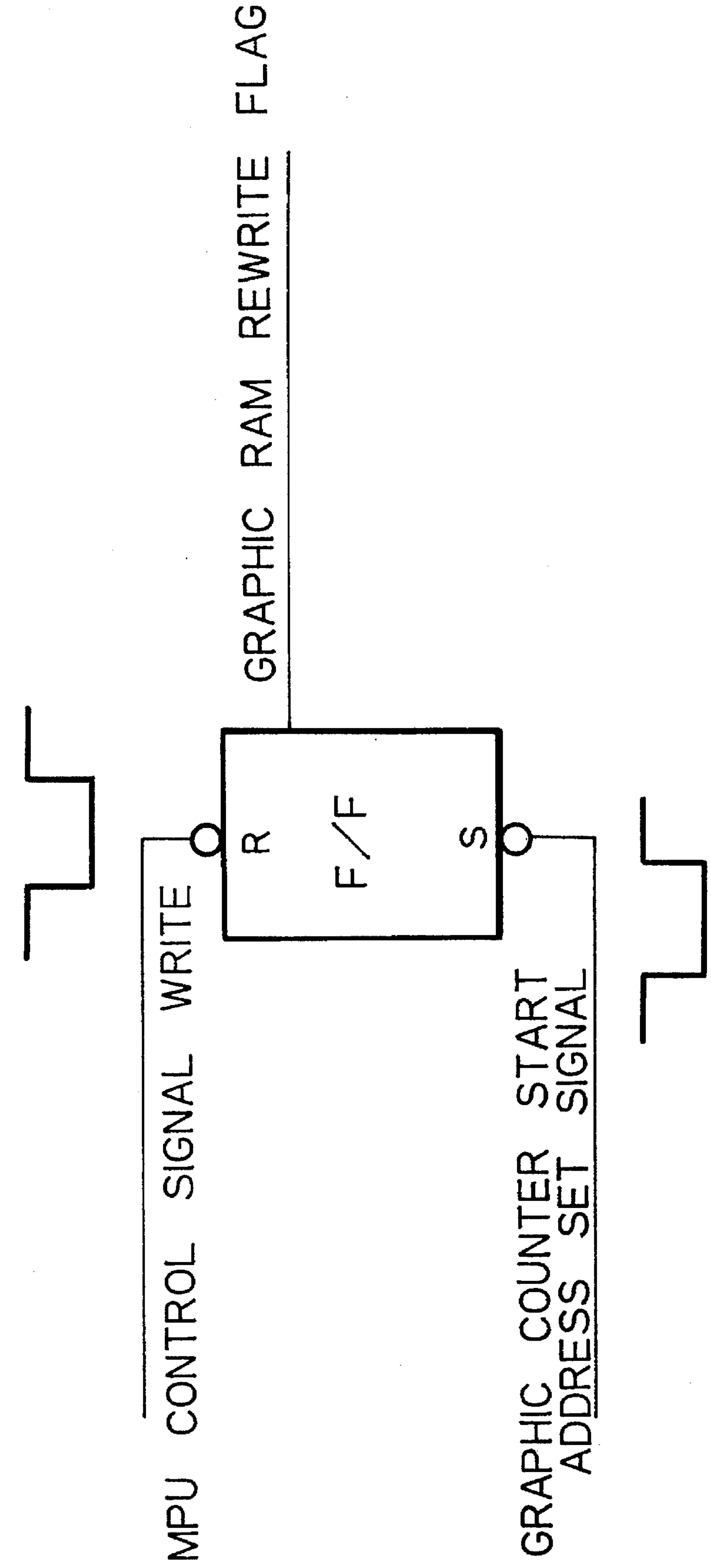
FIG. 5 is a block diagram schematically showing a circuit included in the embodiment for controlling a graphic RAM rewrite flag.

Whether or not the contents of the status RAM 13 are representative of the contents of the graphic RAM 7 faithfully is determined by a check circuit shown in FIG. 5. As shown, the check circuit is implemented by an RS (Reset/Set) flip-flop and is set by the start address (address 0) of the graphic RAM address counter 5 and reset by a write signal included in MPU control signals. In this sense, the output of the check circuit plays the role of a graphic RAM rewrite flag. When the graphic RAM address counter 5 is set at the start address in order to display a single picture from the top left, the check circuit or RS flip-flop is set, i.e., the graphic RAM rewrite flag is set. While the displaying operation is repeated thereafter, the RS flip-flop is reset when the above-mentioned write signal is generated. As a result, the graphic RAM rewrite flag is cleared.

When the displaying operation has completed up to the bottom right of the picture, the graphic RAM rewrite flag is checked. If the flag has been set, it is determined that the status RAM 13 represents the contents of the graphic RAM 7 faithfully. In this condition, data can be selectively read out of the graphic RAM 7 according to the contents of the status RAM 13. On the other hand, if the flag has been cleared, it is determined that the MPU has rewritten the data of the graphic RAM 7. As a result, for the next one frame, data are read out of the graphic RAM 7 in the conventional manner while, at the same time, the contents of the status RAM 13 are updated.

When the graphic RAM rewrite flag is set, display is effected in a power saving mode, as follows. The status RAM is read according to the address designated by the graphic RAM address counter 5. Only when the content of the status RAM 7 is a ZERO, the following content of the graphic RAM 7 is read out and displayed. However, when the content of the status RAM 13 is a ONE, meaning that the corresponding address of the graphic RAM 7 stores the same content as the preceding address, it is not necessary to read the RAM 7. In this case, the content of the latch 9 is displayed. In such a power saving mode, since the status RAM 13 is not updated, the latches 14 and 15 and comparator 16 do not operate.

After one frame has been displayed in the power saving mode, the graphic RAM rewrite flag, FIG. 5, is checked. If the flag has been set, the next frame is also displayed in the power saving mode. However, if the flag has been reset, all the data are read out of the graphic RAM 7 for the next frame and displayed in the ordinary mode. At this instant, the status RAM 13 is updated.

As stated above, when the contents of nearby addresses of the graphic RAM 7 are identical, the RAM 7 is not read, i.e., only the status RAM 13 is read to display data. Since the status RAM 13 has a smaller number of bits than the graphic RAM 7, the current for reading out data is saved.

While the foregoing description has concentrated on a single picture drive type display system, a two picture drive type display system is sometimes applied to a liquid crystal display panel in order to enhance display quality. In the two picture drive type display system, since the consecutive addresses sequentially generated by the graphic RAM address counter 5 not always correspond to data at the consecutive positions in the picture, the arrangement shown in FIG. 4 will be slightly modified. However, the power saving effect is also achievable with the same principle.

Assuming a picture size of 640×480 dots and the configuration shown in FIG. 2, the graphic RAM 7 has a capacity of 540×480×4=1228800 bits (in the case of four planes) while the status RAM 13 has a capacity of 640×480/4=76800 bits. Hence, the capacity of the status RAM 13 is one-sixteenth of the capacity of the graphic RAM 7. The status RAM 13 with such a small capacity can be packaged in a single IC chip together with the display control section. In addition, data lines and address lines for accessing the status RAM 13 can be driven by a minimum of power, further enhancing power saving.

In summary, in accordance with the present invention, whether or not graphic data to be read is identical with the preceding data is determined. If the former data is identical with the latter data, it is displayed without accessing a VRAM which has a number of bits. This is successful in reducing the power consumption of a display control system.

Also, since a graphic RAM rewrite flag is checked frame by frame, correct data can be surely displayed by simple circuitry. Considering the fact that one frame is usually about 1/70 second, it is not necessary to reflect, when the VRAM is rewritten, the rewriting on a display immediately; if new data is displayed in the next frame, the display will appear correct to the operator.

Furthermore, since a second memory is packaged in a single IC chip together with a control section, it is accessible with further smaller power, adding to the power saving effect.

Various modifications will become possible for those skilled in the art after receiving the teachings of the disclosure without departing from the scope thereof.

What is claimed is:

1. A display control system for reducing power consumption of a display, comprising:

a first memory for storing graphic data;

a control section for reading the graphic data out of said first memory repetitively; and a first latch which stores the graphic data read from the first memory;

said control section having determining means for determining whether or not the graphic data each being stored in a respective address of said first memory to be displayed side by side in a picture of said display are identical with each other, and a second memory for memorizing whether or not said graphic data each being stored in the respective address of said first memory are identical with each other;

wherein when a content of said second memory is representative of an identity of the graphic data, said control section causes the graphic data to be displayed by reading the graphic data stored in the first latch without reading said first memory, to thereby reduce power consumption of said display control system.

2. The display control system as claimed in claim 1, further comprising checking means for determining, frame by frame, whether or not contents of said second memory are valid.

3. The display control system as claimed in claim 2, wherein said checking means comprises a flip-flop.

4. The display control system as claimed in claim 1, wherein said second memory has a smaller capacity than said first memory.

5. The display control system as claimed in claim 4, wherein said second memory and said control section are packaged in a single IC chip.

6. The display control system as claimed in claim 1, wherein said first memory and said second memory comprise a graphic RAM and a status RAM, respectively.

7. The display control system as claimed in claim 6, wherein said determining means comprises a second and a third latch to which two data are respectively applied from said graphic RAM, and a comparator for comparing the data of said second and third latches and sending a result of comparison to said status RAM.

* * * * *